Aug. 9, 1949.  T. K. WALMA  2,478,612
FLUID BRAKE

Filed June 25, 1945  3 Sheets-Sheet 1

INVENTOR.
T. K. WALMA
BY
Merrill M. Blackburn.

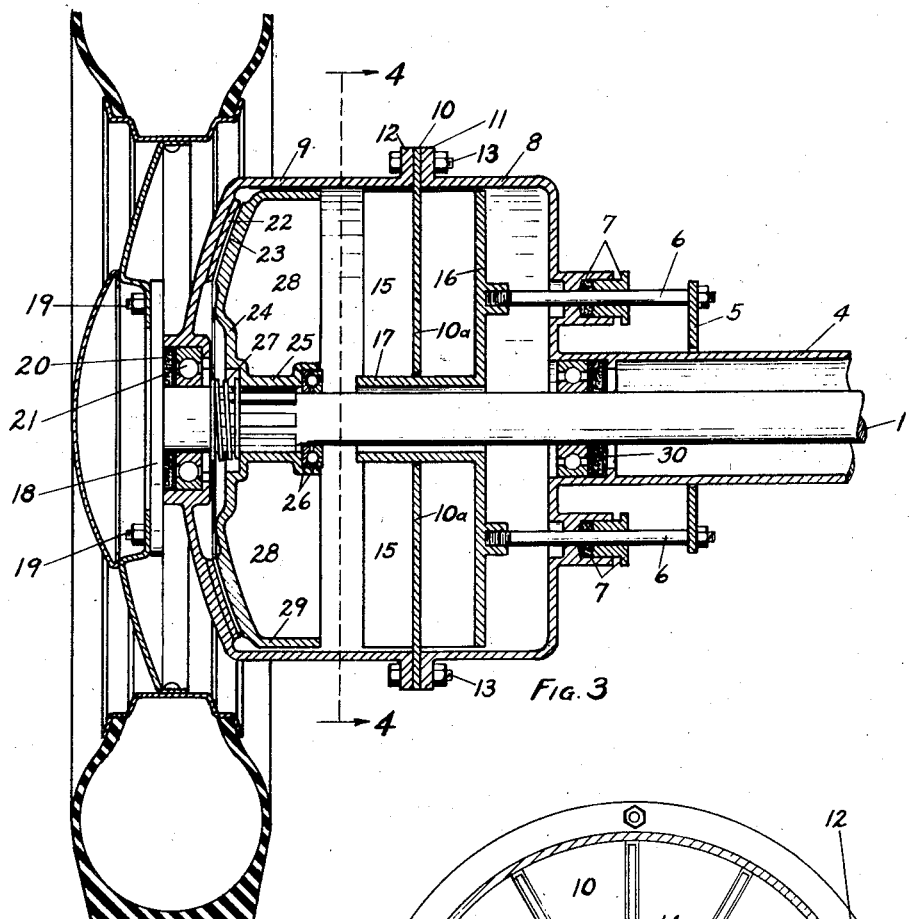
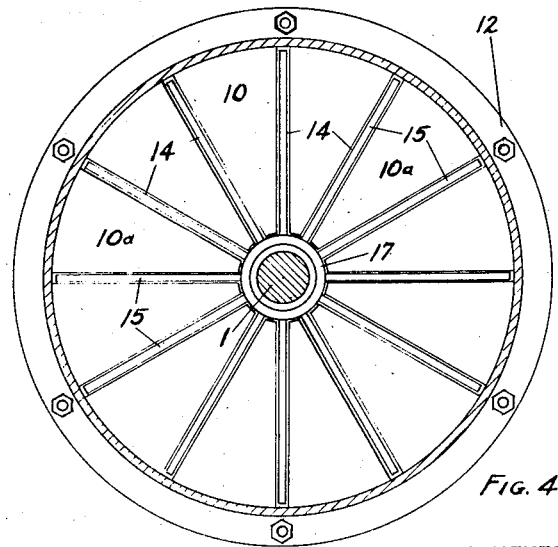

Aug. 9, 1949.  T. K. WALMA  2,478,612
FLUID BRAKE

Filed June 25, 1945  3 Sheets-Sheet 3

INVENTOR.
T. K. WALMA
BY
Merrill M. Blackburn

Patented Aug. 9, 1949

2,478,612

UNITED STATES PATENT OFFICE 2,478,612

FLUID BRAKE

Theodore K. Walma, Iowa City, Iowa

Application June 25, 1945, Serial No. 601,378

7 Claims. (Cl. 188—86)

My present invention relates to improvements in brakes and more especially to a fluid brake adapted to be applied to the axle or drive shaft of a motor vehicle. While this structure may be applied to the transmission shaft of a motor vehicle, it is believed that it will be found most effective when applied to the axle of the driving wheels of such a vehicle. The purpose of this invention is to provide a fluid brake which is comparatively simple to install and effective in use; to provide a structure for the purpose indicated which will be easily operated and not likely to get out of repair; and such further objects, advantages, and capabilities as will hereafter appear and as are inherent in the structure disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 3 is a view similar to Fig. 1 with certain parts in a different position of adjustment;

Fig. 4 represents a transverse section taken substantially along the plane indicated by the line 4—4, Fig. 3.

Figure 1:
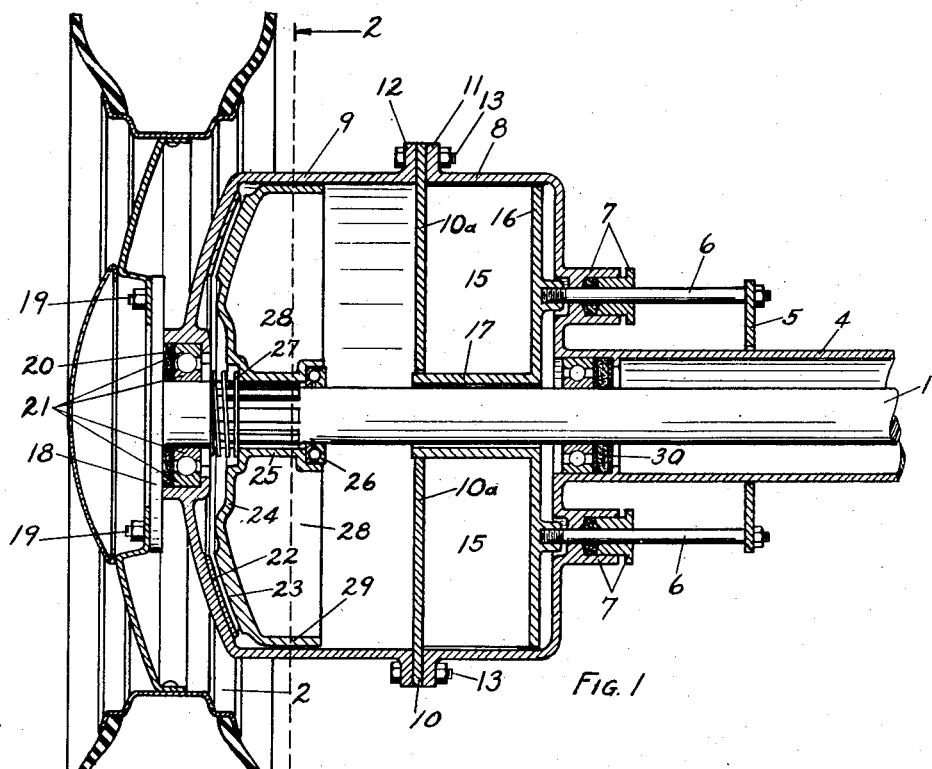
Fig. 1 represents a vertical section of a structure embodying this invention, together with a portion of an axle and a vertical section of a wheel attached thereo.
Figure 2:
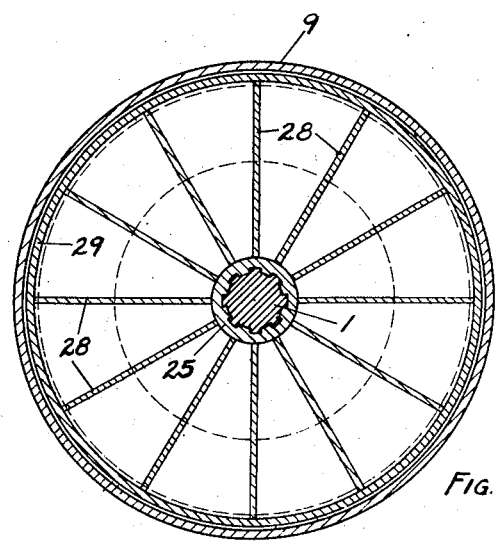
Fig. 2 represents a sectional elevation substantially along the plane indicated by the line 2—2, Fig. 1.
Figure 5:
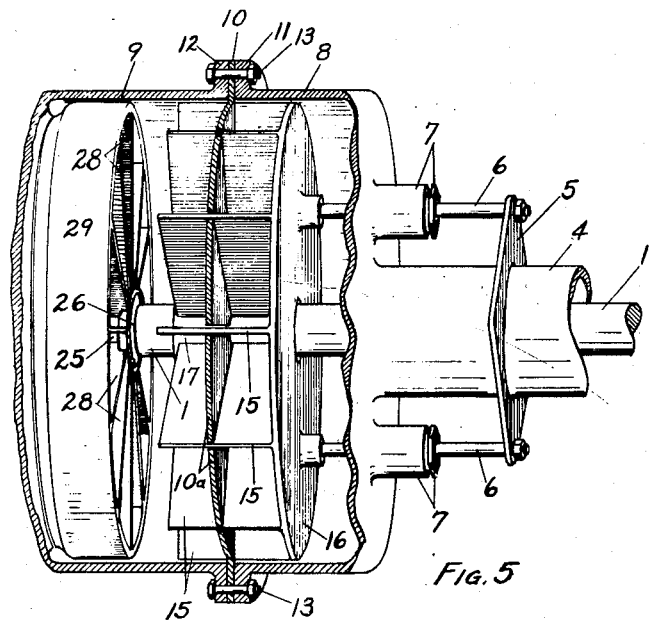
Fig. 5 is a perspective view of the brake with the casing partly broken away and the parts adjusted as in Fig. 3.

Reference will now be made in greater detail to the annexed drawings for a more complete description of this invention. The axle is indicated by the numeral 1, the wheel rim by the numeral 2, and the tire by the numeral 3. The axle is enclosed in a housing 4 which is surrounded by a plate 5 having a plurality of links 6 connected thereto for operation thereby. The plate 5 is movable longitudinally of the housing 4 by any suitable means connected with the brake pedal of the vehicle. The links 6 pass through suitable stuffing boxes 7 which permit sliding of the links but prevent leakage of the brake fluid from the housing made up of the parts 8 and 9. A plate 10 has its uninterrupted edge portion secured between the flanges 11 and 12 of the casing sections 8 and 9, by means of a plurality of bolts 13. It is therefore obvious that the plate is rigid with relation to the housing and, since the housing is held against rotation, the plate 10 is also held against rotation.

As is clear from Fig. 4, the plate 10 is made up of a plurality of sectors 10a extending inwardly from the inner face of housing comprising the parts 8 and 9. These sectors are separated by slots 14 through which the blades or vanes 15 protrude when the plate 5 is adjusted back and forth. The links 6 are connected at their inner ends to a plate 16 which is centrally apertured and has a sleeve 17, surrounding its aperture, capable of being projected into the semi-housing 9 by movement of the plate 5 toward the wheel mounted on the axle 1. The vanes 15 are secured at one edge to the plate 16 and at another edge to the sleeve 17. It is obvious from the foregoing that the blades 15 will partake of the longitudinal motion of the parts 5, 6, 16, and 17 and will be prevented from rotational movement by means of the sectors 10a of the plate 10.

It is clear that if the brake housing is set out close to the wheel 2, 3, then the weight of the body must be borne by the axle housing 4 inwardly from the plate 5. On the other hand, the brake housing may be placed nearer toward the central plane of the car, and then the weight of the car body will be borne by the axle housing between the wheel and the brake housing. As shown in the drawings, a plate 18 is secured to the end of the axle 1 and the disc of the wheel is secured to this plate 18 by means of a plurality of bolts 19. Other modes of mounting the wheel on the axle are, of course, possible.

A grease-retaining packing 20 surrounds the end of the axle and bears against the inner face of the plate 18. This is to prevent leakage of fluid from inside of the brake housing. Inside of the packing 20 is a bearing 21, the purpose of which is well understood. As shown at 22, the inside face of the brake housing element 9 is provided with a braking surface which cooperates with a braking surface 23 of the drum 24. This drum 24 has an inwardly projecting sleeve 25 which is flared radially outwardly to provide a seat for the ball bearing 26. The sleeve 25 is slidable on the axle 1 and is keyed thereto for rotation therewith. A spring 27 bears at one end against the inwardly extending flange of the housing element 9 and at its other end against the outer end of the sleeve 25, thereby holding the braking surfaces 22 and 23 against engagement unless a sufficient outward force on the bearing 26 overcomes the resistance of the spring 27, forcing the braking surfaces into engagement.

When the end of the sleeve 17 engages the ball bearing 26, the vanes 15 are prevented from getting closer to the vanes 28 by reason of the fact that continued pressure on the brake pedal causes the sleeve 17 to compress the spring 27, forcing the brake surface 23 into engagement with the brake surface 22. This, then, because of the engagement between the brake surfaces 22 and 23, of which the surface 22 is non-rotatable, acts as an emergency brake to prevent the vehicle from creeping forwardly.

The vanes 28 are attached at one edge to the inner face of the drum 24 and at their ends to the sleeve 25 and the flange 29. Since the drum 24, 25, 28, 29 is connected to the axle 1 and rotates therewith, and since the housing 8, 9 is held against rotation, there must normally be relative rotation between the vanes 15 and 28 when the vehicle is moving. However, if the brake housing is approximately filled with fluid and the brake pedal is actuated to cause outward movement of the plates 5 and 16, the vanes 15 will move toward the vanes 28, but not quite into engagement therewith. Now, since the vanes 28 are revolving about the axle 1 as an axis, there is a resistance set up between the vanes 15 and 28 by virtue of the viscosity of the brake fluid. A grease packing 30 surrounds the axle, 1 inside of the housing 4, to reduce to a minimum any leakage of the braking fluid from the brake housing.

When the vanes 15 are withdrawn from the vanes 28, as shown in Fig 1, they do not project beyond the outer surface of the plate 10, nor are they withdrarwn from the slots 14 therein. Therefore, a substantially smooth surface is exposed toward the vanes 28 and there is a minimum of friction in the brake housing. On the other hand, as the vanes 15 are forced toward the vanes 28, the friction between them is increased by virtue of the brake fluid being held by the vanes 15 against circulating in the housing and by virtue of the vanes 28 tending to cause the fluid to circulate in the housing. The nearer the vanes 15 get to the vanes 28, the greater will be the resistance and the more the braking force will be increased. Normally, it is not necessary to make use of the brake surfaces 22 and 23 as a sufficient braking effect can be accomplished by means of the vanes 15 and 28 and the enclosed brake fluid. The more the viscosity and the less the fluidity of the brake fluid, the greater will be the braking effect, as will be readily appreciated.

Increase in the separation of the vanes 15 and 28 results in a decrease in the braking force applied to the vehicle, while decrease of the separation has the opposite effect. Also, when the plate 16 is moved toward the wheel far enough to cause engagement of the surfaces 22 and 23, a more positive braking force results. Naturally, the number of vanes in the housing may be varied as found desirable.

It will of course be understood that the specific description of structure set forth above may be departed from without departing from the spirit of this invention as set forth herein and in the appended claims.

Having now described my invention, I claim:

1. A fluid brake for a driven shaft comprising a non-rotatable brake housing through which a driven shaft extends, a drum in the housing slidably connected to the shaft to slide thereon and rotate therewith, said drum having vanes extending longitudinally of the housing, the vanes being connected at their ends to the drum to rotate therewith as the shaft rotates, a centrally apertured plate in the housing substantially separating the same into two compartments, in one of which the drum is located, a second plate located in the other compartment, said second plate having a sleeve surrounding said shaft and being slidable thereon, the first mentioned plate having slots extending from near its outer periphery to its inner limit, vanes on that face of the second mentioned plate which faces the first plate, the last mentioned vanes extending through the slots in the first plate, and mechanism for moving the second mentioned vanes into proximity to the first mentioned vanes.

2. A fluid brake for a rotatable shaft, comprising a non-rotatable plural section housing provided with means to secure the sections together in the form of a container, a centrally apertured plate having a continuous edge portion which is clamped between the housing sections, said plate having slots extending inwardly from the continuous edge portion to the central aperture, said plate substantially dividing the housing into two compartments, a second centrally apertured plate in one of said compartments provided with a sleeve surrounding the aperture of the second plate and slidable on the shaft, the central aperture of the second plate receiving a rotatable shaft which rotates therein, vanes on the second apertured plate and connecting it and the sleeve, the aperture in the first plate slidably receiving said sleeve, said vanes extending into the slots and being adjustable therethrough, means for adjusting the second apertured plate into proximity to the slotted plate to cause the vanes to protrude beyond said slotted plate, and projecting elements carried by the shaft and rotatable therewith to cooperate with said vanes when they are actuated into protruding position.

3. In a fluid brake for a rotatable shaft, a non-rotatable brake housing, the internal surface of which is substantially a surface of revolution, said housing having on the internal face of one of its ends a braking surface, said end of the housing being provided with a substantially frictionless bearing for the shaft, through which the shaft extends, a drum mounted on said shaft adjacent said end, said drum being connected to the shaft slidably but non-rotatably with relation thereto, a brake fluid in said housing, a support in the second end of said housing movable along the shaft toward and away from the drum, a projection on the face of said support exposed toward the drum and capable of being moved into operating engagement therewith, said drum having a braking surface adjacent the braking surface on the housing and adapted to be moved into engagement therewith, said projection on the support being adapted, when the support is moved toward the drum, to cause engagement of the braking surfaces, cooperating means on the drum and the support to cooperate with the brake fluid in exerting a braking force on the drum when the drum and support are caused to approach, and mechanism for causing the drum and support to move, relatively, toward each other.

4. A fluid brake for a rotatable shaft comprising, in combination, a non-rotatable brake housing through which the shaft extends, a drum in said housing having slidable splined connection to said shaft, a spring between the drum and the end of the housing, normally tending to hold the two apart, projections within said drum extending toward the opposite end of the housing, a plate in the opposite end of the housing having an aperture through which said shaft extends, a sleeve connected to said plate around said aperture and surrounding said shaft, said sleeve extending toward said drum, mechanism for moving said plate and its sleeve toward the drum and, on continued movement, moving the drum into engagement with the end of the housing, and projections upon that face of the plate which faces the drum, the projections on the plate cooperating with the projections in the drum, when the plate is moved toward the drum to exert on the drum and shaft a holding force tending to prevent rotation thereof.

5. In a brake for the purpose indicated, a brake housing comprising a pair of cup-shaped sections provided around their open ends with flanges adapted to be secured together to produce a container having an internal surface which is substantially a surface of revolution, said housing having shaft bearings through which a rotatable shaft extends, a plate having an uninterrupted peripheral part clamped between the flanges of the housing sections, said plate having its center open for the reception of said shaft and having slots extending inwardly from said peripheral part to the open center, said plate dividing said housing into a pair of chambers, a drum in one of said chambers and a support in the other chamber, both the drum and the support having projecting elements, the projecting elements on the support extending through the slots toward the projecting elements of the drum, means for causing the drum elements and the support elements to approach, relatively, friction braking means on the inner face of the housing facing the drum, friction braking means on the drum facing the first mentioned friction braking means, and a sleeve attached to said support and surrounding said shaft, said sleeve cooperating with the drum in moving it toward and into engagement with the first mentioned friction braking means.

6. In a fluid brake for a rotatable shaft, a non-rotatable brake housing, the internal surface of which is substantially a surface of revolution, said housing having on the internal face of one of its ends a braking surface, said end of the housing being provided with a substantially frictionless bearing for the shaft, through which the shaft extends, a drum mounted on said shaft adjacent said end, said drum being connected to the shaft slidably but non-rotatably with relation thereto, a support in the second end of said housing movable along the shaft toward and away from the drum, a projection on the face of said support exposed toward the drum and capable of being moved into operating engagement therewith, said drum having a braking surface adjacent the braking surface on the housing and adapted to be moved into engagement therewith, said projection on the support being adapted, when the support is moved toward the drum, to cause engagement of the braking surfaces, and mechanism for causing the drum and support to move, relatively, toward each other.

7. In a structure of the character described, a driven member, a power shaft connected with said driven member to rotate the same, a non-rotatable brake housing surrounding said shaft, a brake drum in one end of said housing, slidably connected to said shaft, a spring surrounding said shaft, located between the drum and the end of the housing, and tending to hold them separated, braking surfaces on the adjacent faces of the drum and housing, means for holding the drum and shaft against relative rotation, non-rotatable means slidably mounted on the shaft and having a projection extending therefrom toward the drum, and means for moving said non-rotatable means toward the drum to cause it to engage the housing.

THEODORE K. WALMA.

REFERENCES CITED

The following references are of record in the file of this patent:

UNITED STATES PATENTS

| Number | Name | Date |
| --- | --- | --- |
| 2,150,867 | Voigt | Mar. 14, 1939 |
| 2,241,189 | Dick | May 6, 1941 |
| 2,280,897 | Denman | Apr. 28, 1942 |